(12) United States Patent
Cooper

(10) Patent No.: US 9,791,312 B2
(45) Date of Patent: Oct. 17, 2017

(54) OFDR SYSTEM FOR LOCALIZED VIBRATION DETECTION

(71) Applicant: Daniel Boyd Cooper, Christiansburg, VA (US)

(72) Inventor: Daniel Boyd Cooper, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 188 days.

(21) Appl. No.: 14/713,044

(22) Filed: May 15, 2015

(65) Prior Publication Data

US 2015/0377692 A1    Dec. 31, 2015

Related U.S. Application Data

(60) Provisional application No. 62/017,477, filed on Jun. 26, 2014.

(51) Int. Cl.
  *G01N 21/00* (2006.01)
  *G01H 9/00* (2006.01)
  *G01M 11/00* (2006.01)

(52) U.S. Cl.
  CPC ........ *G01H 9/004* (2013.01); *G01M 11/3172* (2013.01)

(58) Field of Classification Search
  CPC ........................... G01H 9/004; G01M 11/3172
  USPC .......................................................... 356/73
  See application file for complete search history.

(56) References Cited

U.S. PATENT DOCUMENTS

| | | | | |
|---|---|---|---|---|
| 4,319,186 A | * | 3/1982 | Kingsley | G01H 9/004 324/96 |
| 4,525,818 A | * | 6/1985 | Cielo | G01H 9/004 356/44 |
| 5,202,745 A | * | 4/1993 | Sorin | G01M 11/3172 356/479 |
| 5,355,208 A | * | 10/1994 | Crawford | G01D 5/35383 250/227.19 |

(Continued)

FOREIGN PATENT DOCUMENTS

WO    2013138653 A1    9/2013

OTHER PUBLICATIONS

Kersey, Alan D., et al. "Fiber Grating Sensors." Journal of Lightwave Technology 15.8 (1997).*

(Continued)

*Primary Examiner* — Hina F Ayub
(74) *Attorney, Agent, or Firm* — Cantor Colburn LLP

(57) ABSTRACT

A vibration detector and method of measuring vibration are described. The vibration detector includes an optical fiber comprising a reference reflector and a delay coil, and one or more sensors comprised at respective one or more locations in the optical fiber, each of the one or more sensors including a center reflector and two side reflectors on either side of the center reflector, the delay coil eliminating detection of interference among reflections from the one or more sensors. The vibration detector also includes a light source to introduce light into the optical fiber to interrogate the optical fiber, a detector to obtain interference signals, each of the interference signals being based on interference between reflections from the reference reflector and one of the one or more sensors; and a processor to process each of the interference signals to obtain vibration measurements.

20 Claims, 3 Drawing Sheets

(56) References Cited

U.S. PATENT DOCUMENTS

| | | | |
|---|---|---|---|
| 5,757,487 A * | 5/1998 | Kersey | G01D 5/35383 |
| | | | 356/478 |
| 5,844,235 A * | 12/1998 | Tachikawa | G01M 11/3172 |
| | | | 250/227.12 |
| 6,274,863 B1 * | 8/2001 | Kersey | G01V 1/16 |
| | | | 250/227.14 |
| 6,285,806 B1 * | 9/2001 | Kersey | G01D 5/35383 |
| | | | 385/12 |
| 6,678,441 B1 | 1/2004 | Taylor | |
| 6,795,623 B2 | 9/2004 | Duan et al. | |
| 7,245,382 B2 | 7/2007 | Ronnekleiv | |
| 7,282,698 B2 | 10/2007 | Childers | |
| 7,340,136 B2 | 3/2008 | Po et al. | |
| 7,515,276 B2 | 4/2009 | Froggatt et al. | |
| 7,538,860 B2 | 5/2009 | Moore | |
| 7,781,724 B2 | 8/2010 | Childers et al. | |
| 8,400,620 B2 | 3/2013 | Froggatt et al. | |
| 8,638,444 B2 | 1/2014 | Duncan et al. | |
| 2005/0219512 A1 * | 10/2005 | Froggatt | G01M 11/3172 |
| | | | 356/73.1 |
| 2007/0051882 A1 * | 3/2007 | Childers | E21B 47/065 |
| | | | 250/227.14 |
| 2008/0212082 A1 | 9/2008 | Froggatt et al. | |
| 2010/0038079 A1 * | 2/2010 | Greenaway | E21B 47/0007 |
| | | | 166/254.2 |
| 2010/0067018 A1 * | 3/2010 | Crickmore | G01D 5/35303 |
| | | | 356/477 |
| 2010/0139403 A1 | 6/2010 | Liang et al. | |
| 2011/0231112 A1 | 9/2011 | Soejima et al. | |
| 2012/0174677 A1 | 7/2012 | Hill | |
| 2012/0179378 A1 | 7/2012 | Duncan et al. | |
| 2012/0293806 A1 | 11/2012 | Cranch | |
| 2013/0034351 A1 * | 2/2013 | Goldner | G01D 5/35354 |
| | | | 398/25 |
| 2013/0170843 A1 | 7/2013 | Baney | |
| 2014/0268111 A1 * | 9/2014 | Couch | G01M 11/31 |
| | | | 356/73.1 |

OTHER PUBLICATIONS

Yun, Seok Hyun, D. J. Richardson, and Byoung Yoon Kim. "Interrogation of fiber grating sensor arrays with a wavelength-swept fiber laser." Optics letters 23.11 (1998): 843-845.*

Childers, Brooks A., et al. "Recent developments in the application of optical frequency domain reflectometry to distributed Bragg grating sensing." Environmental and Industrial Sensing. International Society for Optics and Photonics, 2002.*

International Search Report and Written Opinion for PCT Application No. PCT/US2015/031106, dated Aug. 28, 2015, pp. 1-7.

* cited by examiner

OFDR SYSTEM FOR LOCALIZED VIBRATION DETECTION

CROSS-REFERENCE TO RELATED APPLICATION

This application is a Non-Provisional of U.S. Provisional Patent Application Ser. No. 62/017,477 filed Jun. 26, 2014, the disclosure of which is disclosure of which is incorporated by reference herein in its entirety.

BACKGROUND

Monitoring vibration may be helpful in various applications. For example, an electronic submersible pump (ESP) may be used for a number of purposes (e.g., water extraction, slurry pumping) in subsurface and other environments. When vibration of the ESP is monitored, failures may be predicted before they occur, thereby minimizing disruption of operation and potential collateral damage to other components. When vibration monitoring is done for a component like the ESP, the measurement must be of localized strain. That is, the measurement should be distributed over no more than a few inches of the component. Failure prediction may be challenged without such localized measurements.

SUMMARY

According to an embodiment of the invention, a vibration detector includes an optical fiber comprising a reference reflector and a delay coil; one or more sensors comprised at respective one or more locations in the optical fiber, each of the one or more sensors including a center reflector and two side reflectors on either side of the center reflector, the delay coil configured to eliminate detection of interference among reflections from the one or more sensors; a light source configured to introduce light into the optical fiber to interrogate the optical fiber; a detector configured to obtain interference signals, each of the interference signals being based on interference between reflections from the reference reflector and one of the one or more sensors; and a processor configured to process each of the interference signals to obtain vibration measurements.

According to another embodiment of the invention, a method of measuring vibration includes obtaining interference signals based on a reference reflector and one or more sensors located along respective one or more locations on an optical fiber, each of the one or more sensors comprising a center reflector and two side reflectors on either side of the center reflector; isolating each of the interference signals from each of the one or more sensors; performing amplitude demodulation on each of the interference signals to obtain amplitude signals associated with each of the one or more sensors; performing phase demodulation of each of the amplitude signals; and obtaining vibration measurements based on the performing the phase demodulation of each of the amplitude signals.

BRIEF DESCRIPTION OF THE DRAWINGS

Referring now to the drawings wherein like elements are numbered alike in the several Figures.

DETAILED DESCRIPTION

As noted above, monitoring vibration of a component requires measuring localized strain. In addition, high spectral resolution and sampling rates in excess of 120 Hertz (Hz) are required. Currently, cavity-based techniques and grating-based techniques are two types of optical methods for acquiring strain measurements from a modified optical cable. Cavity-based techniques (e.g., optical frequency domain reflectometry (OFDR), phase modulation) involve measuring the change in length of an optical cavity formed by a pair of reflectors. Thus, these techniques are generally limited to measuring strain over relatively long lengths (on the order of a meter), and the measurement of dynamic strain (vibration) using cavity-based techniques is limited to integration of the measurement over the length of the cavity. Grating-based techniques measure a change in spectral response of a fiber Bragg grating (FBG), which occurs as the structure of the grating changes due to a strain state of the fiber. Because gratings generally only span a few centimeters of the fiber, a FBG-based approach provides localized strain measurements but presents challenges with respect to interrogating the fiber fast enough to perform vibration measurements at a meaningful sampling frequency. Embodiments of the systems and methods discussed herein relate to detecting vibration by performing localized OFDR measurements using a vibration sensor comprising three broadband reflectors. Based on the OFDR implementation, distributed vibration measurements may be obtained simultaneously from a series of the vibration sensors at different locations along the fiber.

Figure 1:
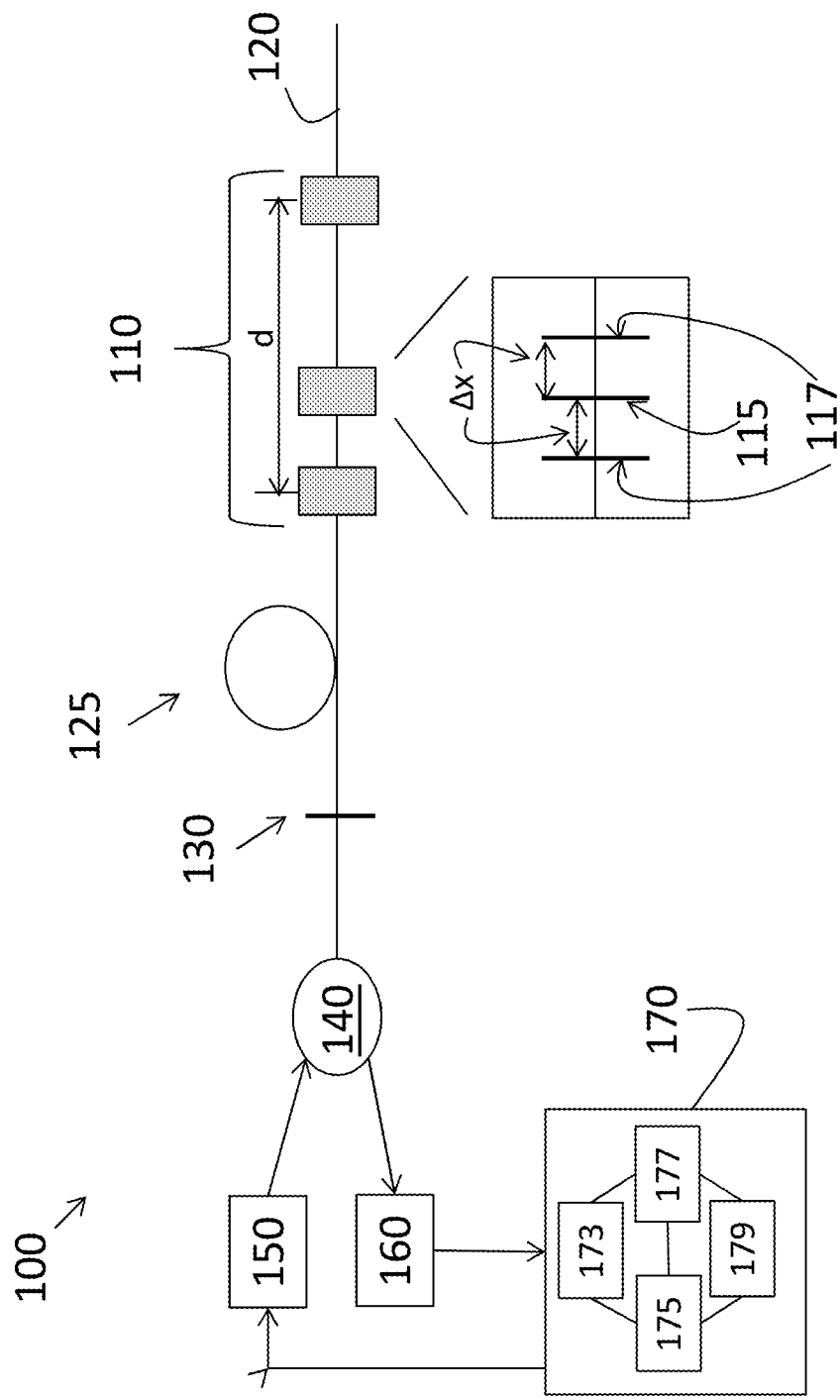
FIG. 1 is a block diagram of a vibration detector according to an embodiment of the invention.

FIG. 1 is a block diagram of a vibration detector 100 according to an embodiment of the invention. The vibration detector 100 is shown with multiple sensors 110, which may be located at different locations along the optical fiber 120. As shown in FIG. 1, the sensors 110 need not be uniformly spaced along the optical fiber 120. Each sensor 110 includes three broadband reflectors 115, 117. The center reflector 115 and each of the two side reflectors 117 may be separated by a distance ($\Delta x$) on the order of 6 inches or less (total length of a sensor 110 may be on the order of 12 inches or less). The reflectivity (Rc) of the center reflector 115 is at least two times greater than the reflectivity (Rs) of each of the side reflectors 117. This difference in reflectivity (between Rc and Rs) may be achieved in a number of known ways, including but not limited a discontinuity (e.g., air gap) in the optical fiber 120, ultra violet light (UV) induced broadband reflectors, and chirped fiber Bragg gratings (FBGs) which have a broadband response over a specified frequency range. Each of the reflectors 115, 117, 130 may be a different type of broadband reflector, and embodiments discussed herein are not limited based on the specific way that the reflectors 115, 117, 130 are fabricated.

The light source 150 is injected into the optical fiber 120 through a circulator 140, and resulting interference signals are directed through the circulator 140 to the detector 160. The light source 150 may be a swept laser and produces coherent light over a liner range of wavenumbers. The light from the light source 150, channeled through the circulator 140, encounters a broadband reference reflector 130 and a delay coil 125. The length of the delay coil 125 is greater than a distance d between the first and last sensor 110 locations. Thus, while there is no design limit on the locations of the sensors 110, and the locations may be selected such that different sensors 110 monitor vibration of different components of a system, for example, the related size of the delay coil 125 may place a practical limit on the locations (maximum distance between locations) of the sensors 110. For example, when the vibration detector 100 is used in a subsurface environment (e.g., in a borehole) to monitor vibration of an ESP or other device, the delay coil 125 size and, consequently, the maximum distance between the first and last sensors 110, may have a practical limit. The delay coil 125 facilitates isolation of interference only with the reference reflector 130. That is, interference among reflections from the different sensors 110 are eliminated based on the delay coil 125, and only interference between reflections of each sensor 110 with the reflection from the reference reflector 130 are isolated for further processing to determine vibration. The detector 160 that receives the reflections from the optical fiber 120 may include or be coupled to a processing system 170 that includes an input interface 173, one or more processors 175, one or more memory devices 177, and an output interface 179.

Figure 2:
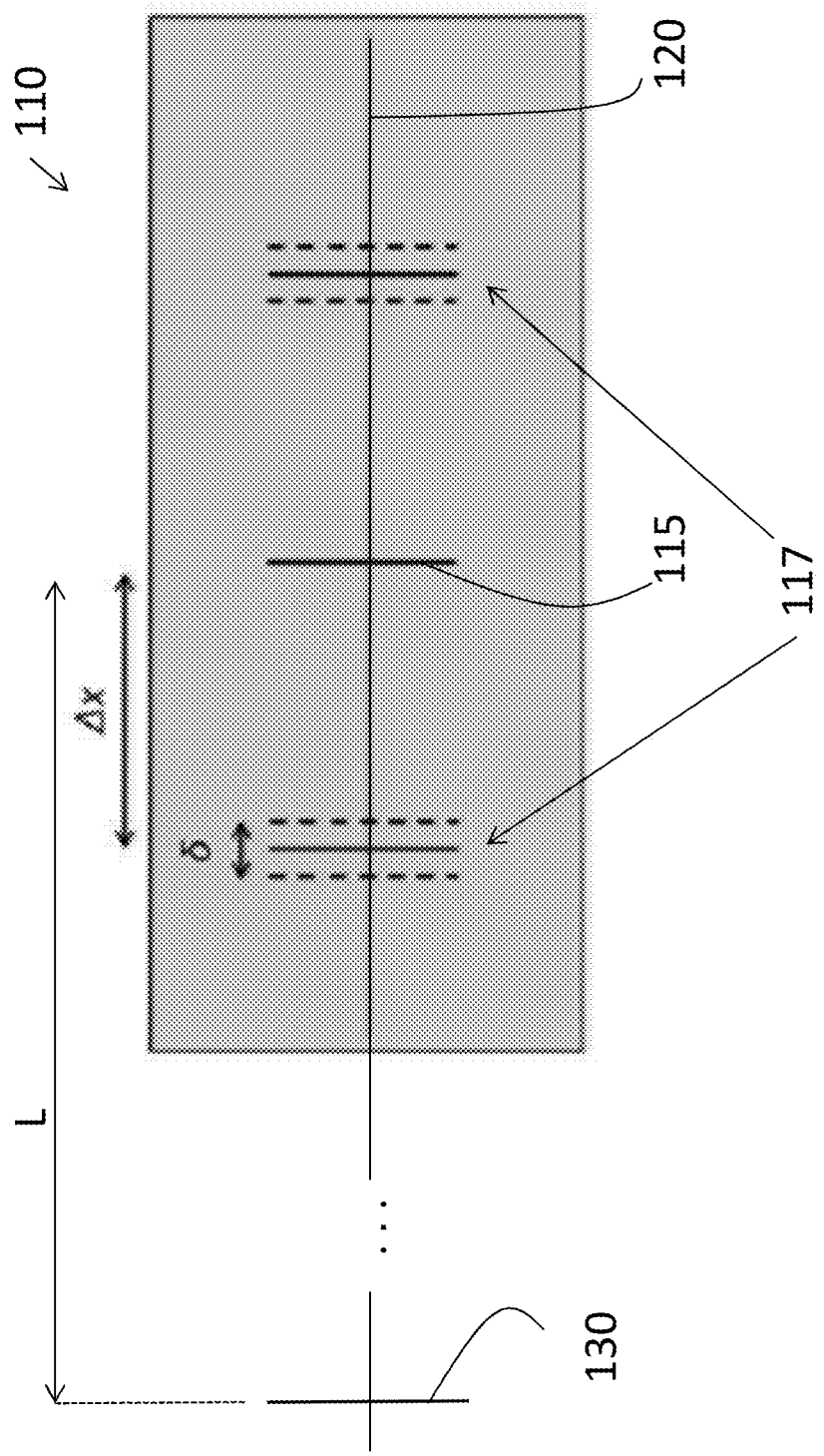
FIG. 2 shows a sensor of the vibration detector shown in FIG. 1.

FIG. 2 shows a sensor 110 of the vibration detector 100 shown in FIG. 1. The indicated δ corresponds to a change in the length Δx because of vibration and is a function of time. The interference signal resulting from each sensor 110 (based on interference with reflections from the reference reflector 130) is given by:

$$I(t)=R_s \cos(4\pi n(L(t)-\Delta x-\delta(t))v(t))+R_c \cos(4\pi n L(t)v(t))+R_z \cos(4\pi n(L(t)+\Delta x+\delta(t))v(t)) \quad [\text{EQ. 1}]$$

L is the length between the center reflector 115 and the reference reflector 130, as shown in FIG. 2, and varies with time based on vibration, n is the index of refraction of the optical fiber 120, and v(t) is the instantaneous wavenumber of the light source 150 output. EQ. 1 may be written as:

$$\left[R_c\left(1+\frac{2R_s}{R_c}\cos(4\pi n(\Delta x+\delta(t))v(t))\right)\right]\cos(4\pi n L(t)v(t)) \quad [\text{EQ. 2}]$$

As shown in EQ. 2, the interference signal represents an amplitude modulated signal. Because of the center reflector 115, the carrier signal is never over-modulated. EQ. 2 indicates that the interference signal is mathematically equivalent to dual sideband transmitted carrier (DSBTC) amplitude modulation (AM). The amplitude modulation may be detected by known envelope detection methods, so that the exact distance between the sensor 110 and the reference reflector 130 does not need to be known to demodulate the signal. In other words, product detection is not necessary. Amplitude of the interference signal may then be obtained as:

$$A(t)=\cos(4\pi n(\Delta x+\delta(t))v(t)) \quad [\text{EQ. 3}]$$

The amplitude signal shown in EQ. 3 represents a phase modulated signal. The oscillatory phase component, δ(t), of the phase modulated signal represents the vibration measurement. Thus, phase demodulation, by known techniques, may be used to obtain the vibration measurement from the signal shown in EQ. 3.

Figure 3:
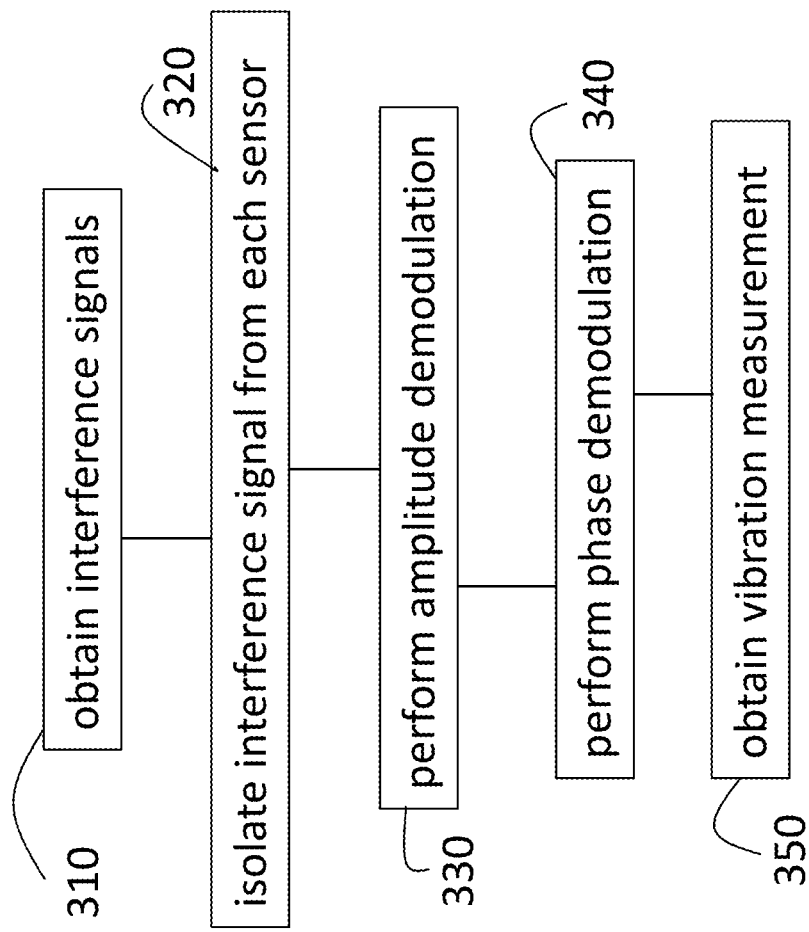
FIG. 3 is a process flow of a method of obtaining vibration measurements according to embodiments of the invention.

FIG. 3 is a process flow of a method of obtaining vibration measurements according to embodiments of the invention. At block 310, obtaining interference signals includes disposing the vibration detector 100 such that each of one or more sensors 110 is coupled to a component (e.g., ESP) whose vibration is of interest. Isolating the interference signal from each sensor 110 is based on the processor 175 performing a Fourier transform on the detector 160 output and implementing a bandpass filter to isolate the interference signal associated with each sensor 110. The Fourier transform provides frequency as a function of length (between the reference reflector 130 and sensor 110) based on the swept wavenumber of the light source 150 output. Thus, the value of L for a given sensor 110 may be used to determine the interference signal associated with that sensor 110. Once the interference signal for a given sensor 110 (given by EQs. 1 and 2) is isolated, performing amplitude demodulation at block 330 gives the amplitude signal shown in EQ. 3. The amplitude demodulation may be performed with known techniques such as envelope detection. At block 340, performing phase demodulation may include using a Hilbert transform. At block 350, obtaining the vibration measurement is based on the phase demodulation, because the vibration is represented by the oscillatory phase component.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A vibration detector, comprising:
an optical fiber comprising a reference reflector;
one or more sensors comprised at respective one or more locations in the optical fiber, each of the one or more sensors including a center reflector and two side reflectors on either side of the center reflector, each of the center reflector and the two side reflectors being broadband reflectors that reflect a plurality of wavelengths;
a light source configured to introduce light into the optical fiber to interrogate the optical fiber;
a detector configured to obtain interference signals, each of the interference signals being based on interference between reflections from the reference reflector and one of the one or more sensors; and
a processor configured to process each of the interference signals to obtain vibration measurements.

2. The detector according to claim 1, wherein the vibration detector includes two or more sensors and the optical fiber further comprises a delay coil, the delay coil is disposed between the reference reflector and the two or more sensors, and the delay coil is configured to eliminate detection of interference among reflections from the two or more sensors.

3. The detector according to claim 2, wherein a length of the delay coil is greater than a length between one of the two or more sensors closest to the delay coil and another of the two or more sensors farthest from the delay coil on the optical fiber.

4. The detector according to claim 1, wherein a reflectance of the center reflector of each of the one or more sensors is at least two times greater than a reflectance of each of the two side reflectors.

5. The detector according to claim 1, wherein the light source is a swept laser configured to sweep a linear range of wavenumbers.

6. The detector according to claim 1, further comprising a circulator configured to channel light from the light source into the optical fiber and channel the interference signals to the detector.

7. The detector according to claim 1, wherein the processor isolates each of the interference signals resulting from the one or more sensors based on a length between the reference reflector and the center reflector of the respective one or more sensors.

8. The detector according to claim 1, wherein the processor performs amplitude demodulation of each of the interference signals to obtain amplitude signals associated with each of the one or more sensors.

9. The detector according to claim 8, wherein the processor performs phase demodulation on the amplitude signals associated with each of the two or more sensors.

10. The detector according to claim 9, wherein the vibration measurements are based on the phase demodulation for each of the two or more sensors.

11. A method of measuring vibration, comprising:
obtaining interference signals based on a reference reflector and one or more sensors located along respective one or more locations on an optical fiber, each of the one or more sensors comprising a center reflector and two side reflectors on either side of the center reflector, wherein the center reflector and the two side reflectors are broadband reflectors that reflect a plurality of wavelengths;
isolating each of the interference signals from each of the one or more sensors;
performing amplitude demodulation on each of the interference signals to obtain amplitude signals associated with each of the one or more sensors;
performing phase demodulation of each of the amplitude signals; and
obtaining vibration measurements based on the performing the phase demodulation of each of the amplitude signals.

12. The method according to claim 11, wherein the obtaining the interference signals includes obtaining each of the interference signals based on interference between reflections from the reference reflector and reflections from a respective one of the one or more sensors.

13. The method according to claim 12, wherein, based on the obtaining the interference signals from two or more sensors, the obtaining the interference signals further includes disposing a delay coil between the reference reflector and the two or more sensors.

14. The method according to claim 13, wherein the disposing the delay coil includes fabricating the delay coil with a length greater than a length between one of the two or more sensors closest to the delay coil and another of the two or more sensors farthest from the delay coil on the optical fiber.

15. The method according to claim 11, wherein the isolating each of the interference signals includes performing a Fourier transform.

16. The method according to claim 15, wherein the isolating each of the interference signals is based on a length, corresponding with the Fourier transform, between the reference reflector and the center reflector of the respective one or more sensors.

17. The method according to claim 11, wherein the performing the phase demodulation includes performing a Hilbert transform.

18. The method according to claim 11, further comprising interrogating the optical fiber with light from a swept laser sweeping a linear range of wavenumbers to obtain the interference signals.

19. The method according to claim 11, further comprising disposing at least one of the one or more sensors on a portion of an electronic submersible pump to monitor vibration and predict failure of the electronic submersible pump.

20. The method according to claim 11, wherein the performing the amplitude demodulation includes performing envelope detection.

* * * * *